(12) United States Patent
Bellamy

(10) Patent No.: US 7,203,699 B2
(45) Date of Patent: Apr. 10, 2007

(54) COMPUTERIZED SYSTEM FOR AUTOMATED COMPLETION OF FORMS

(76) Inventor: Robert E. Bellamy, 673-c Alpha Dr., Cleveland, OH (US) 44143-2140

( * ) Notice: Subject to any disclaimer, the term of this patent is extended or adjusted under 35 U.S.C. 154(b) by 341 days.

(21) Appl. No.: 10/876,538

(22) Filed: Jun. 28, 2004

(65) Prior Publication Data

US 2005/0289114 A1 Dec. 29, 2005

(51) Int. Cl.
*G06F 17/30* (2006.01)
*G06F 17/00* (2006.01)

(52) U.S. Cl. .................. 707/102; 707/2; 707/10; 707/101; 715/506; 715/507; 715/508

(58) Field of Classification Search ............ 707/2, 707/10, 100, 101, 102; 715/505, 508, 506, 715/507; 713/193; 382/213
See application file for complete search history.

(56) References Cited

U.S. PATENT DOCUMENTS

| | | | |
|---|---|---|---|
| 5,450,537 A | | 9/1995 | Hirai et al. |
| 5,640,577 A | | 6/1997 | Scharmer |
| 6,026,187 A | | 2/2000 | Siegel |
| 6,088,700 A | | 7/2000 | Larsen et al. |
| 6,192,380 B1 | * | 2/2001 | Light et al. .............. 715/505 |
| 6,460,042 B1 | | 10/2002 | Hitchcock et al. |
| 6,704,906 B1 | * | 3/2004 | Yankovich et al. ......... 715/505 |
| 6,748,426 B1 | * | 6/2004 | Shaffer et al. ............. 709/219 |
| 6,751,607 B2 | * | 6/2004 | Kraay et al. .................. 707/3 |
| 6,754,874 B1 | * | 6/2004 | Richman ................... 715/507 |
| 6,832,349 B1 | * | 12/2004 | Seamans .................... 715/500 |
| 6,859,694 B2 | * | 2/2005 | Andrews et al. ............. 701/25 |
| 6,968,500 B2 | * | 11/2005 | Mikhailov et al. .......... 715/505 |
| 7,000,179 B2 | * | 2/2006 | Yankovich et al. ......... 715/506 |
| 7,072,059 B2 | * | 7/2006 | Van Der Linden et al. . 715/500 |
| 7,100,110 B2 | * | 8/2006 | Shiraishi et al. ........... 715/514 |
| 7,103,835 B1 | * | 9/2006 | Yankovich et al. ......... 715/505 |
| 7,111,235 B1 | * | 9/2006 | Morgan et al. ............. 715/520 |
| 2001/0054046 A1 | | 12/2001 | Mikhailov |
| 2003/0028792 A1 | | 2/2003 | Plow et al. |
| 2003/0188260 A1 | * | 10/2003 | Jensen et al. ............... 715/505 |

* cited by examiner

*Primary Examiner*—Shahid Alam
(74) *Attorney, Agent, or Firm*—Richard C. Litman

(57) ABSTRACT

The computerized system for automated completion of forms is an Internet accessible system for automatically completing forms such as employment or other applications from individual user data retained in a database. The computerized system for automated completion of forms provides for conversion of a paper application form into an electronic form image that is then mapped to identify entry fields, define electronic entry fields associated with the entry fields on the paper form, and associate the electronic entry fields with data item definitions in the database for automatic filling of the form fields form data stored in the database. Users may enter their personal data into the database for subsequent filling of forms either through a default data entry process, or by filling out a first form.

7 Claims, 14 Drawing Sheets

My Application

Personal Information

First Name: _____  Middle Initial: ___

Last Name: _____

Address: _____

City: _____  State: ___  Zip: _____

Country: _____

[Save]  [Cancel]

*My Application*

Personal Information

First Name: [First Name] Middle Initial: [Middle Initial]

Last Name: [Last Name]

Address: [Address 1] [Address 2]

City: [City] State: [State] Zip: [Zip Code]

Country: [Country]

[Save] [Cancel]

Get latest Java plugin from Sun

*Fig. 8*

Category Table 1010

| CategoryID | Category | Class |
|---|---|---|
| 1 | My Application | Application |
| 2 | Personal Info | Module |
| 3 | First Name | Field |
| 4 | Last Name | Field |
| 5 | Address1 | Field |
| 6 | Address2 | Field |
| 7 | Telephone | Field |
| 8 | Reference | Module |

CategoryPC Table 1020

| CategoryPCID | ParentID | ChildID |
|---|---|---|
| 1 | 0 | 1 |
| 2 | 1 | 2 |
| 3 | 2 | 3 |
| 4 | 2 | 3 |
| 5 | 2 | 5 |
| 6 | 2 | 6 |
| 7 | 2 | 7 |
| 8 | 1 | 8 |
| 9 | 8 | 3 |
| 10 | 8 | 4 |
| 11 | 8 | 7 |

CategoryPCValue Table 1050

| CategoryPCID | Value | UserID |
|---|---|---|
| 3 | Robert | 1 |
| 4 | Bellamy | 1 |
| 5 | My Street Address | 1 |
| 6 | MY ZipCode | 1 |
| 9 | Tom | 1 |
| 10 | Smith | 1 |
| 11 | 555-1212 | 1 |
| 3 | John | 2 |
| 4 | Doe | 2 |
| 5 | John's Street Address | 2 |

COMPUTERIZED SYSTEM FOR AUTOMATED COMPLETION OF FORMS

BACKGROUND OF THE INVENTION

1. Field of the Invention

The present invention relates to the automated filling and completion of forms such as employment application forms. More specifically, the invention is a computerized system for automated completion of forms that allows paper application forms to be converted to an electronic image, mapped to data items stored in a database, and automatically filled with individual user data.

2. Description of the Related Art

Paper forms, such as employment applications, applications for admission to schools and universities, applications for public or government services, paperwork related to banking and other commercial institutions, and other forms too numerous to identify, are repeatedly encountered in the course of life. Each form must be filled out, and each form often requires entry of substantially the same information as the others. Personal information, for example, including name, address, telephone contact information, and the like, must be entered on virtually every form. Employment applications generally require entry of previous employers. School or university applications require entry of previous education, extra-curricular activities, and the like. It is desirable to devise a system whereby, on completion of a first form, or on entry of a suite of "core information", form entry information is stored for subsequent recall and use in filling out subsequent applications. Equally important to creating and maintaining a core information database is a system for quick and easy conversion of a paper form into an automatically fillable form image.

Various computer-based systems have been devised for automatically filling out electronic forms, and for generating electronic forms from paper forms.

U.S. Pat. No. 6,088,700, issued on Jul. 11, 2000 to K. Larsen et al., discloses a data processing system for forms completion in a global information network. The system uses data stored in a database to automatically fill out data fields of the various forms displayed on users' web browsers. Forms in an electronic format, such as Hypertext Markup Language (HTML) or PDF, are submitted to the system and parsed by a computer processor to identify data entry fields, matching the data entry fields to data items defined in a common fields database. Unmatched fields, which are fields that appear in the electronic form but aren't matched in the common fields database, are identified in a unique form fields database associated with the form. When a user fills out the form, form field information is stored partly in the common fields database and partly in the unique form field database for the given form.

Thus, according to the '700 invention, when a user needs to fill out the same form again, information may be retrieved from the databases. However, data from the unique form field database is not available for a different form requesting the same information. Thus, where a user wishes to fill out several disparate forms, the automatic completion of forms may be incomplete and may create a redundancy in stored information where data fields that are not part of the common fields database are nonetheless requested on multiple forms. Another drawback of this system is that the automatic parsing of the electronic forms, while quick and efficient, may fail to map entry fields to an appropriate entry in the common fields database if a synonym for an item in the common field database is used in the electronic form but is not recognized by the parser. Further, because the system accepts forms in electronic forms, such as HTML or PDF, the problem of replicating a paper form is not addressed.

U.S. Pat. No. 5,450,537, issued on Sep. 12, 1995 to C. Hirai et al., discloses a method and apparatus for completing a document in accordance with a blank tabularized form document from data automatically retrieved from a database. An image of a blank form is read into the system. A form recognition component recognizes the form of the blank and generates form data indicating the position of entry fields on the form, as well as the data item associated with the entry field.

U.S. Pat. No. 6,026,187, issued on Feb. 15, 2000 to R. Siegel, discloses a system for automatically filling an original form. A user of the system first scans a blank paper form to create and store an image of the paper form within the system as a first document. The first document is displayed overlaid with a second, blank document. The user enters data into the second document, formatting the data to coincide with entry fields in the first document. Once completed, the blank paper form is inserted into a printer and the second document printed out, the entered data aligning with the entry fields of the paper form.

U.S. Pat. No. 6,460,042, issued on Oct. 1, 2002 to M. Hitchcock et al., discloses a universal forms engine that allows data sharing between customizable on-line forms, such as college admission applications. The system uses, rather than images of existing paper forms, a form description file to define each application form. U.S. Pat. No. 5,640,577, issued on Jun. 17, 1997 to A. Scharmer, discloses a data processing system with automated at least partial forms completion.

U.S. patent Publication No. 2001/0054046, published on Dec. 20, 2001, discloses an automatic forms handling system. Form publishers submit electronic forms, along with associated reports, in a variety of formats including HTML, Extended Markup Language (XML), PDF, and word processing formats. Data entered into the forms by users is not used to complete the present or subsequent form, but is instead used along with accumulated data received from other users to fill in the report associated with the form.

U.S. patent Publication No. 2003/0028792, published on Feb. 6, 2003, discloses a system, method, and computer program product for automatically inputting user data into Internet based electronic forms.

None of the above inventions and patents, taken either singly or in combination, is seen to describe the instant invention as claimed. Thus a computerized system for automated completion of forms solving the aforementioned problems is desired.

SUMMARY OF THE INVENTION

The computerized system for automated completion of forms allows conversion of paper forms into an electronic image and form suitable for automatic filling or completion with user information stored in a database.

Users of the computerized system for automated completion of forms fall generally into one of three groups, although it will be recognized that some users may belong to more than a single group. The first group of users are form publishers or form providers. These are users who have a form to be submitted to the system so that other users may access the form and fill out the form based on personal information. An example of a user in this group is an employer, who has an employment application to be made available for employment candidates. The second group of users are staff or administrative users, who provide supporting services to the computerized system for automated completion of forms. A typical role of staff or administrative users is maintenance of databases and uploading form images. The third group of users are form fillers, or individuals who primarily access the computerized system for automated completion of forms for the purpose of accessing forms for completion based on their personal information maintained in the database. It can be recognized that a form filler may fill the role of form provider when the form filler has a paper form and would like to submit the paper form for electronic completion.

A form provider provides a form, typically in hardcopy form, such as a paper form submitted through a postal service or a paper form submitted by facsimile transmission. A staff or administrative user scans the hardcopy form to create an electronic form image, such as a bitmap image. Alternatively, the form provider may submit the form electronically, already in an electronic form image format. The electronic form image is stored in the database.

Once a new form is received, and stored in an electronic form image format, form entry fields are identified and mapped to data items in the database. The mapping is both logical, associating, for example, a "first name" entry field on the form with a "first name" data entry in the database, and physical, identifying the position of the entry field in the form image and creating an electronic data entry field associated with that position.

A staff or administrative user performs these identifying and mapping tasks. The form image is displayed on a computer display for the staff or administrative user. The staff or administrative user then visually identifies each entry field on the form image and, using a pointing input device, such as a mouse cursor, defines a suitable electronic entry field coinciding with the entry field of the form image. During the creation of the electronic entry field, the staff or administrative user selects a data entry type from the database to associate with the electronic entry field. If no data entry type exists in the database to correspond with the entry field on the form image, the staff or administrative user adds a new data entry type record to the database. It can be appreciated that the staff or administrative user, as a human actor, can make associations between synonymous words or phrases, recognize spelling errors, or even deal with multilingual forms with a greater degree of flexibility than may be achievable by a computerized parsing algorithm of moderate cost and complexity.

Once a form has been submitted, converted to an electronic form image, stored in an electronic form image format, and mapped to logically associate entry fields with data items in the database and to physically associate electronic entry fields in position relative to the electronic form image, a form filler may access the form to be filled in with data stored in the database.

A form filler may enter data into the database in either of two manners. The form filler may select a form and have the electronic form image displayed on the form filler's computer display overlaid by the electronic entry fields. The form filler then enters the data into the electronic entry fields, the entered data being stored into the database. Alternatively, the form filler may access a default data entry display, where data is entered corresponding to all of the data items defined in the database rather than merely data items associated with a single form.

Once the form filler's data has been entered into the database, by either method, subsequent forms are filled out automatically. Only if a selected form requires a data item that the form filler has not yet provided will the form filler be required to enter additional information. A completed form may be printed, the final printed form having the same appearance as the original paper form. Alternatively, a completed form may be electronically delivered, such as by e-mail, to a recipient.

The system's database allows for definition of new data items within the database by the addition of new database row entries, rather than requiring modification of the database table structure. Thus, when a form provider submits a new form that has an entry field for a data item that is not currently known to the database, the new data item can be added without modification of the database table structure and without any reprogramming. Additionally, the database structure allows for organization of data items relative to other data items in a parent/child relationship, as well as organization of data items in groups or "modules." An example of a group or "module" of data items is a user's address that includes street address, city, state, and zip code. An address module, then, would be a collective organization of street address, city, state, and zip code data items.

Another example of grouping of data items involves multiple instances of like data entry fields. For example, on an employment application it is common to request personal references. Each personal reference includes the reference name, and contact information, such as a telephone number. A single personal reference might be expressed as a module including first name, last name, and telephone number entry fields. Further, where a form requires entry of multiple references, a references module might include a plurality of single reference modules, each referring to the primitive data items first name, last name, and telephone number. These groupings are facilitated by the parent/child relationship between entries in the database.

Additionally, data items within the database may include, or represent, links to separate documents or document images stored within the database. This allows for the incorporation of separate document images, such as professional certifications, either with, or as attachments to, a form.

These and other objects of the present invention will become readily apparent upon further review of the following specification and drawings.

BRIEF DESCRIPTION OF THE DRAWINGS

FIG. 5 is a screen shot showing an application image at the start of the data mapping process according to the present invention.

FIG. 7 is a screen shot showing an application image with a mapped entry field according to the present invention.

FIG. 8 is a screen shot showing a fully mapped application image according to the present invention.

FIG. 10B is a block diagram showing primary database tables with row entries describing a hypothetical form according to the present invention.

Similar reference characters denote corresponding features consistently throughout the attached drawings.

DETAILED DESCRIPTION OF THE PREFERRED EMBODIMENT

The present invention is a computerized system for automated completion of forms that allows paper forms to be converted into, and saved in, an electronic image format for automatic completion from user data contained within a database.

Figure 1:
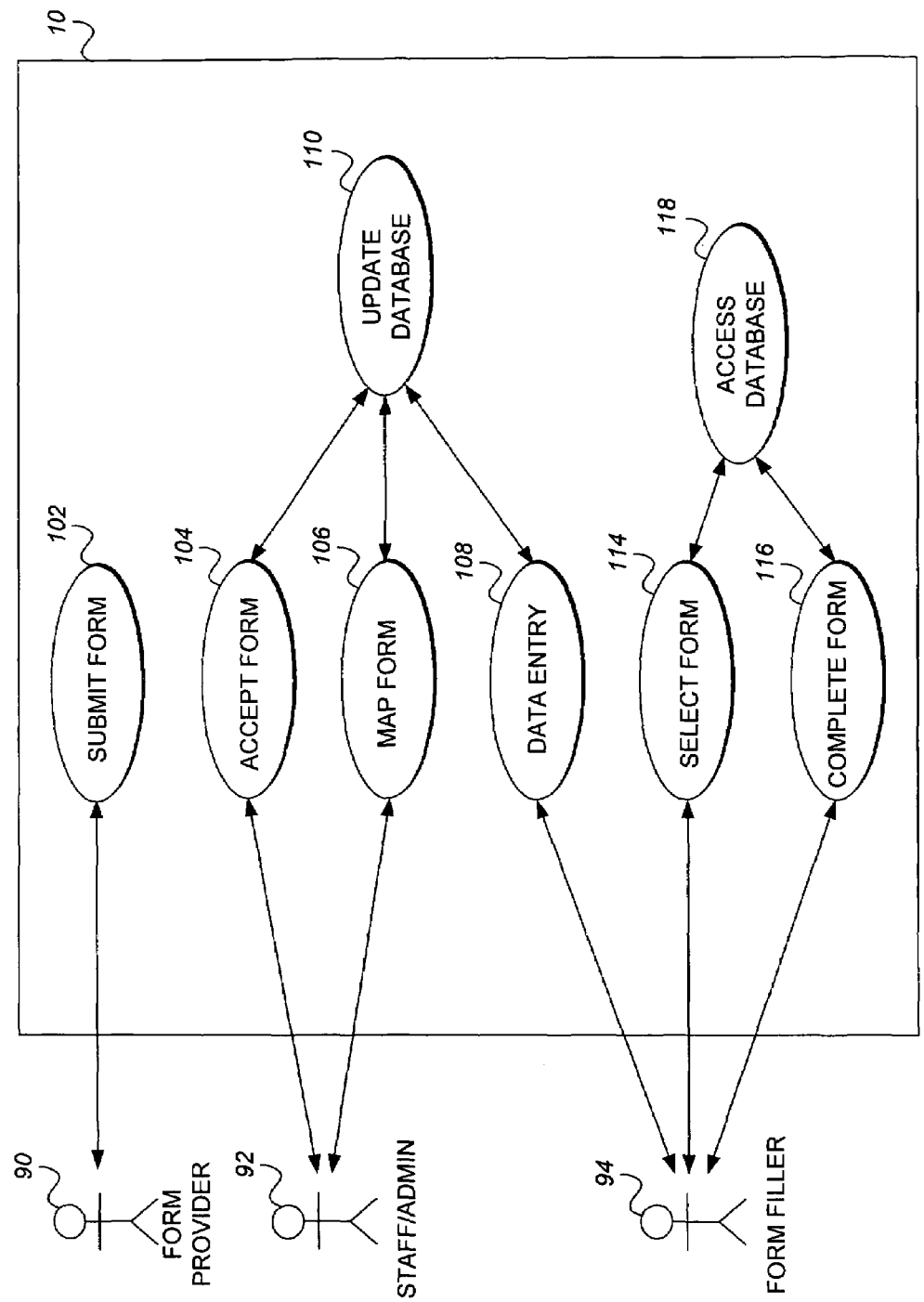
FIG. 1 is a block diagram depicting the primary functions of a computerized system for automated completion of forms according to the present invention.

Referring to FIG. 1, the computerized system for automated completion of forms 10 is characterized by the interaction of various users with the computerized system for automated completion of forms 10. The various users of the computerized system for automated completion of forms 10 include form providers 90, staff or administrative users 92, and form fillers 94.

Form providers 90 are users who have paper forms and wish to submit their paper form to be converted into an electronic form for use with the computerized system for automated completion of forms 10. Thus, the interaction of a form provider 90 with the computerized system for automated completion of forms 10 is represented as a "submit form" activity 102.

Staff or administrative users 92 are users who help to maintain and operate the computerized system for automated completion of forms 10. Staff or administrative users 92 accept paper forms, convert the paper forms into an electronic form and store them within the computerized system for automated completion of forms 10, and map the forms to identify form entry fields and create related electronic form entry fields. Staff or administrative users 92 also maintain the database of the computerized system for automated completion of forms 10, adding and deleting data items as needed. Thus, the interaction of a staff or administrative user 92 with the computerized system for automated completion of forms 10 is represented by form accepting 104 and form mapping 106 activities, supported by database updating utilities 110.

Form fillers 94 are users who wish to use the computerized system for automated completion of forms 10 to enter their personal data into the computerized system for automated completion of forms 10, access a form within the computerized system for automated completion of forms 10, and have the form automatically completed from the personal data that they have stored. Thus, the interaction of a form filler 94 with the computerized system for automated completion of forms 10 is represented by data entry 108, form selection 114, and form completion 116 activities, supported by database maintaining utilities 110 and database accessing utilities 118.

Figure 2:
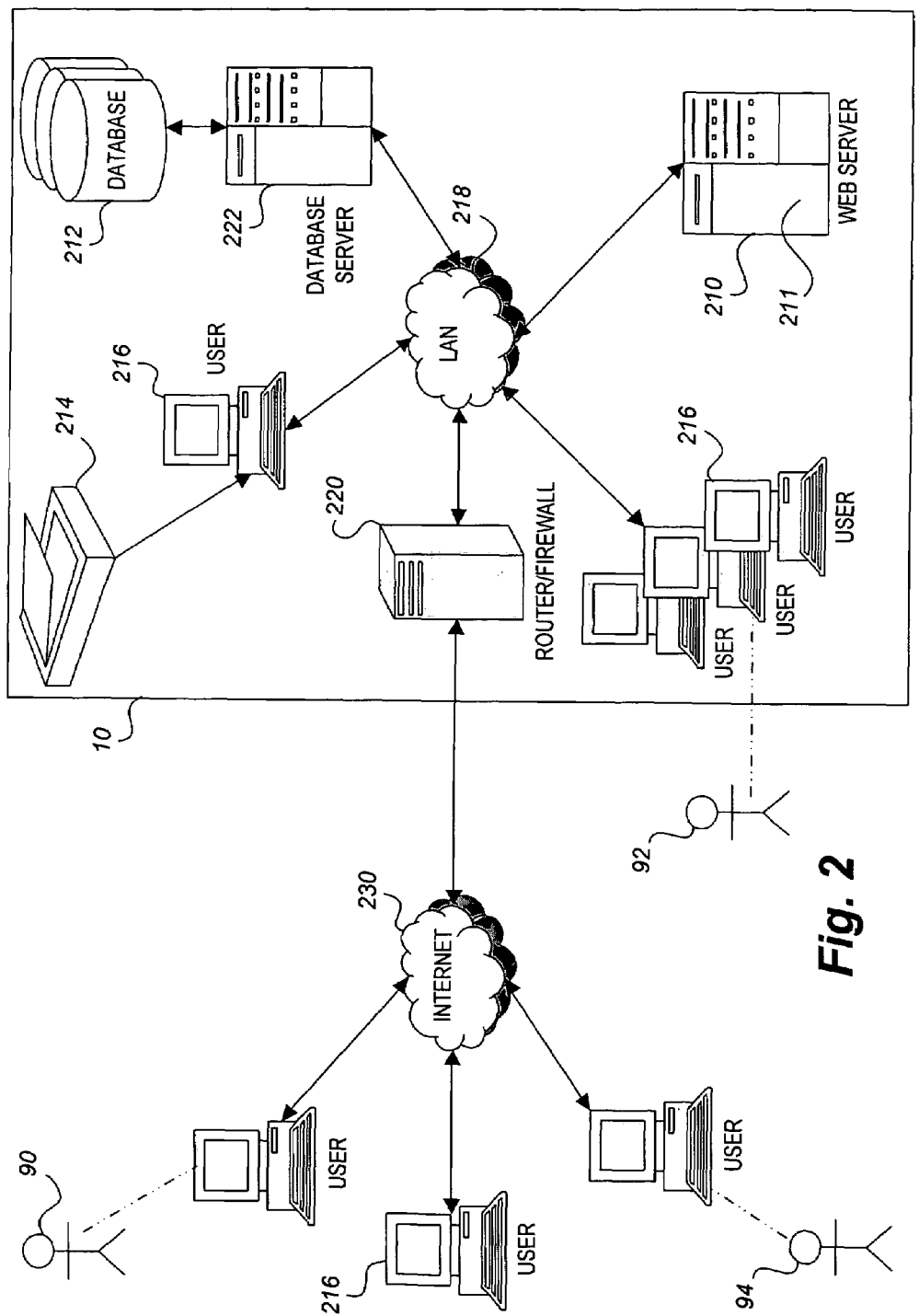
FIG. 2 is a block diagram of a network architecture for the computerized system for automated completion of forms according to a preferred embodiment of the present invention.

The computerized system for automated completion of forms 10 is implemented in a computer processing system, with one or more computer software components stored on one or more computer processors to enable the functional activities described. Referring to FIG. 2, the computerized system for automated completion of forms 10 is shown in a preferred embodiment for networked use and in particular use via the Internet 230.

The computerized system for automated completion of forms 10 in this configuration includes a server computer 210 executing a computer program 211 that interacts with the users to perform the functional activities described. User computer workstations 216 are in communication with the server computer 210 via a local area network (LAN) 218. The computerized system for automated completion of forms 10 includes a document scanner 214. In the illustrated configuration, the document scanner 214 is in communication with one of the user computer workstations 216, although the document scanner 214 could be configured in connection directly with the LAN 218 or directly with the server computer 210. Additionally, a database server computer 222 is shown managing a database 212, the database server 222 in communication with the server computer 210 via the LAN 218. The computerized system for automated completion of forms 10 is connected to the Internet 230 through a router or firewall 220 for security. It can be recognized that the computerized system for automated completion of forms 10 can be implemented in numerous alternative configurations.

Additional user computer workstations 216 are shown connected to the computerized system for automated completion of forms 10 via the Internet 230. Generally, form providers 90 and form fillers 94 will access the computerized system for automated completion of forms 10 from computer workstations 216 connected to the Internet, while staff or administrative users 92 will use computer processing stations 216 connected to the LAN 218, or even connected directly to the, server computer 210. All of the computer workstations 216 are preferably configured to run an Internet client program such as a World Wide Web browser program.

Figure 3:
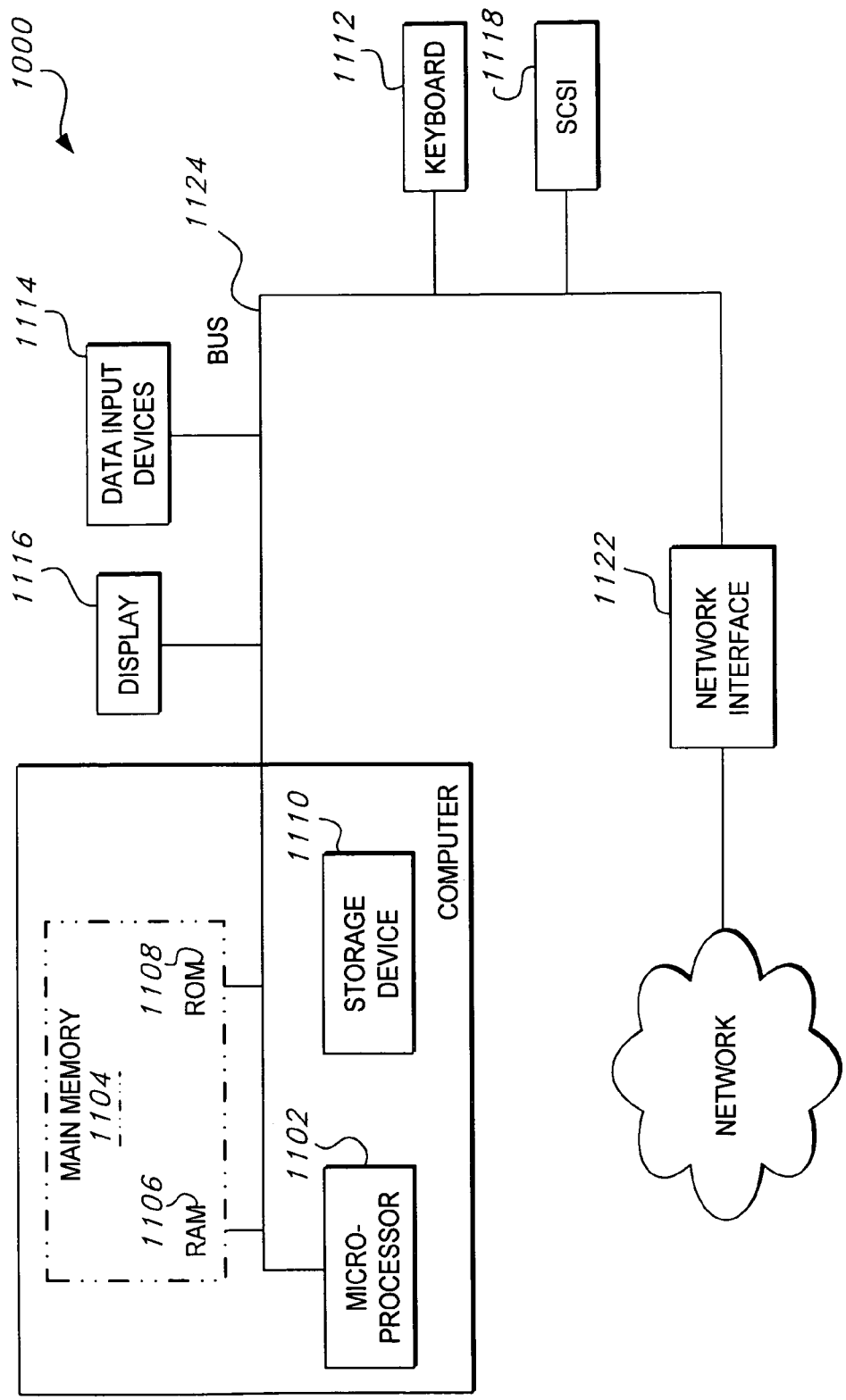
FIG. 3 is a block diagram of a computer system in which the computerized system for automated completion of forms operates according to a preferred embodiment of the present invention.

Turning to FIG. 3, the server computer 210, database server computer 222, and computer workstations 216 are general purpose or personal computers 1000 of a generally known and common configuration. Such a computer has a microprocessor 1102 connected by a bus 1124 to an area of main memory 1104, comprising both read only memory (ROM) 1108, and random access memory (RAM) 1106, and a storage device 1110 such as a disk storage device having means for reading a coded set of program instructions on a computer readable medium which may be loaded into main memory 1104 and executed by the microprocessor 1102. The computer 1100 has a display device 1116, a keyboard 1112, and may include other input devices 1114 such as a mouse, joystick, etc. A network communication interface 1122 is provided for serial communications on a network or other serial communications link. Additionally, the computer 1100 may include a Small Computer System Interface (SCSI) adapter 1118 for communication with peripheral devices.

The computer program 211 is storable in, and executable by the microprocessor 1102 from, the main memory 1104 of the server computer 210. The computer program 211 provides user interfaces, generally in the form of screen displays or web pages, which are accessible by the computer workstations 216. In a preferred embodiment, the user interfaces are web pages that are displayed by a client program such as an Internet browser running on the computer workstations 216. It can be recognized that some of the web pages will include client side application code or applets, such as Java applets that function within the client program domain on the computer workstations 216 and are in communication with the server computer 210.

When a form provider 90 submits a form, the form may be submitted either in paper form or in an electronic form image format. If the paper form is submitted, its conversion to an electronic form image format and entry into the computerized system for automated completion of forms 10 is performed by a staff or administrative user 92 who loads the paper form into the document scanner 214 and causes the computer program 211 to activate the document scanner 214 to generate an electronic form image. Alternatively, if the form provider 90 desires to submit a form already in an electronic form image format, such as a bitmap format, the form provider 90 may send the form in an electronic form image format via an electronic transfer method. Thus, the computer program 211 includes computer instructions to implement the "submit form" activity 102 of the form provider 90 by presenting a web page to the form provider 90 and receiving a form in an electronic form image format from the form provider 90 electronically, such as by email, file transfer protocol (FTP), or another file transfer method or interface using the Internet.

Turning now to FIGS. 4–8, the computer program 211 includes computer instructions to implement the form accepting 104 and form mapping 106 activities of the staff or administrative user 92. Referring to the flowchart in FIG. 4, and beginning with the decision of step 401, if a paper form is received it must be converted into an electronic form image format and stored in the database 212. If the form was submitted electronically, it is already stored in an electronic form image format. At step 402, the staff or administrative user 92 must scan the paper form to create an electronic form image by loading the paper form into the document scanner 214 and causing the computer program 211 to activate the document scanner 214 to generate an electronic form image. At step 404, the electronic form image is stored into the database 212 along with additional detail information such as a title, a unique identifier, a source identifier, etc.

At step 406, the computer program 211 generates a user interface display consisting of a form view 500, displaying the electronic form image 501. The form view 500 is preferably in the form of a web page that is displayable by a client program running on a remote workstation computer. Additionally, the web page preferably includes a client side program such as a Java applet to assist in the form mapping. The electronic form image 501 is an image of a paper form, and includes entry fields and data identifiers such as the first name data identifier 502 associated with the first name entry field 504. Each of the entry fields on the form must be identified by the staff or administrative user 92, and mapped to create an electronic entry field and associate the electronic entry field with a data item in the database 212.

At step 410, the staff or administrative user 92 determines if a data item definition exists in the database 212 that is suitable to associate with each entry field as identified by an associated data identifier. In the example illustrated, first name entry field 504 is identified by the first name data identifier 502. Thus, a form filler's first name is to be entered into the first name entry field 504. The staff or administrative user 92 must determine if a data item definition exists in the database 212 that is suitable to associate with the first name data identifier 502. If not, the staff or administrative user 92 must add a new data item definition into the database 212 at step 414, according to a process that will be discussed below.

Figure 6:
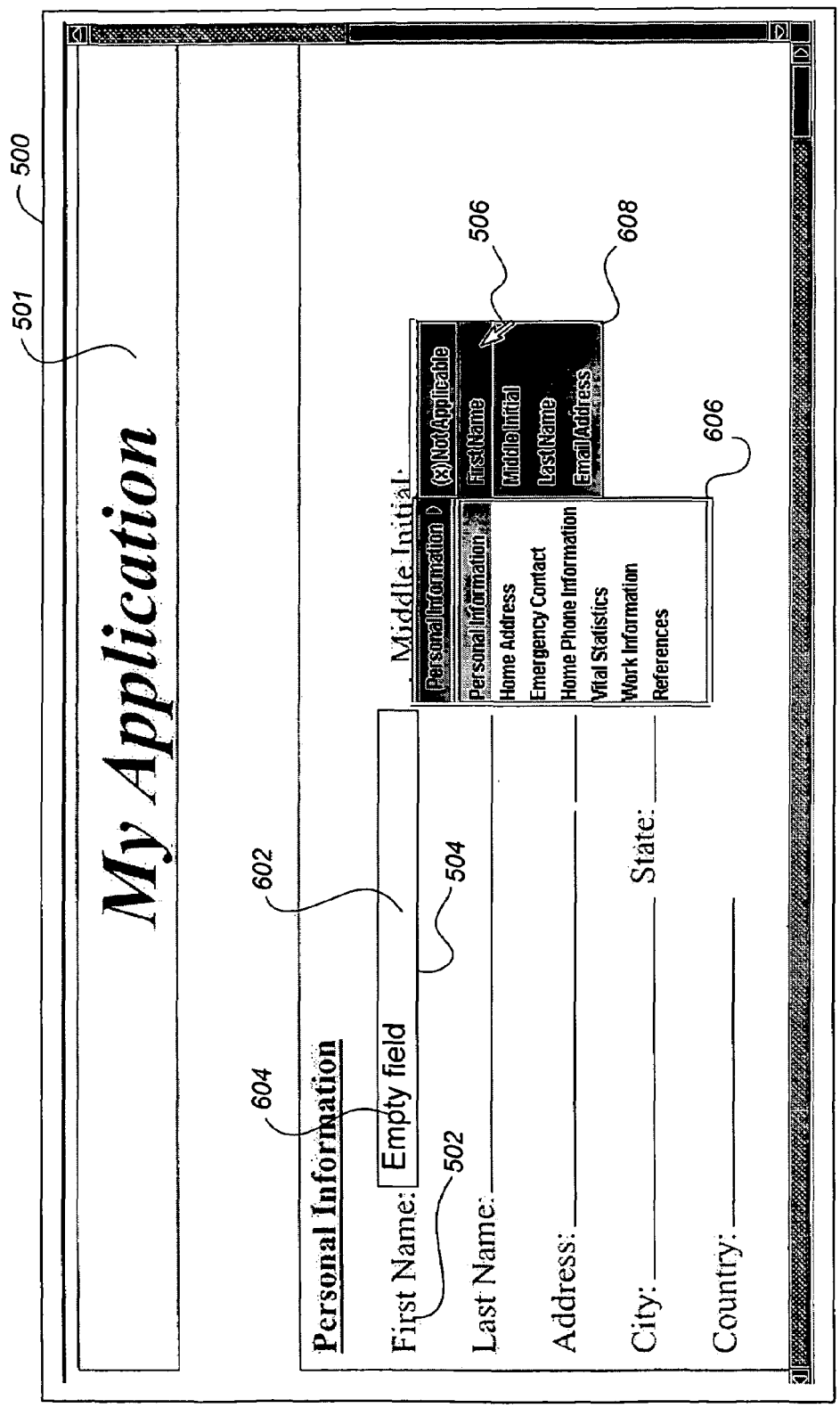
FIG. 6 is a screen shot showing an application image with an entry field identified, and showing a dialog box for selection of a data item for mapping according to the present invention.

If an appropriate data item definition exists in the database 212, the entry field is mapped at step 416 by using a cursor 506 to define an electronic entry field coinciding with the entry field of the electronic form image. Referring to FIG. 6, electronic entry field 602 is shown drawn overlaying first name entry field 504, adjacent to the first name data identifier 502. An electronic entry field identifier 604 appears inside the electronic entry field 602, defaulted on creation of the entry field identifier 604 to indicate that there is not yet a data item definition associated with the electronic entry field 602.

Figure 7:
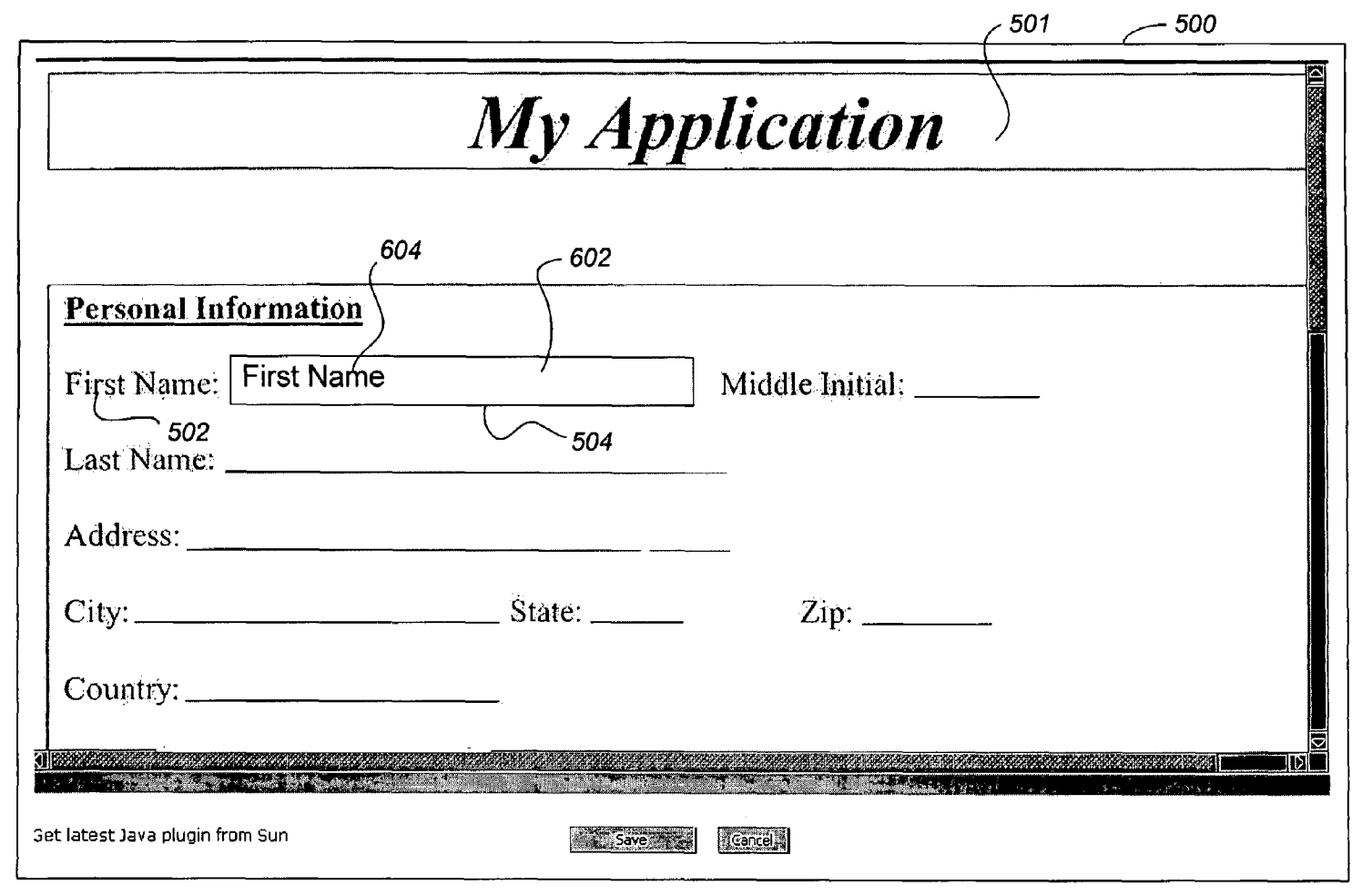

With the electronic entry field 602 created, the display position of the electronic entry field 602 in relation to the electronic form image 501 is stored, preferably by XY coordinates, in the database along with the definition of the electronic entry field 602 at step 418. After the electronic entry field 602 is created, the computer program 211 displays one or more data item selection menus such as selection menu 606 and selection submenu 608 for selection of a data item definition from the database 212 at step 420. The cursor 506 is used to navigate the menus and select data item definition. In the example illustrated, a data item definition for "first name" is selected to match the first name data identifier 502. Referring now to FIG. 7, the form view 500 displays the electronic form image 501 after completion of the mapping operation for the first name entry field 504, with the electronic entry field 602 overlaying entry field 504 adjacent to the first name data identifier 502. Electronic entry field identifier 604 reflects that the electronic entry field 602 is associated with a "first name" data item definition within the database 212. Turning now to FIG. 8, the form view 500 displays the electronic form image 501 after all of the entry fields have been mapped.

Figure 9:
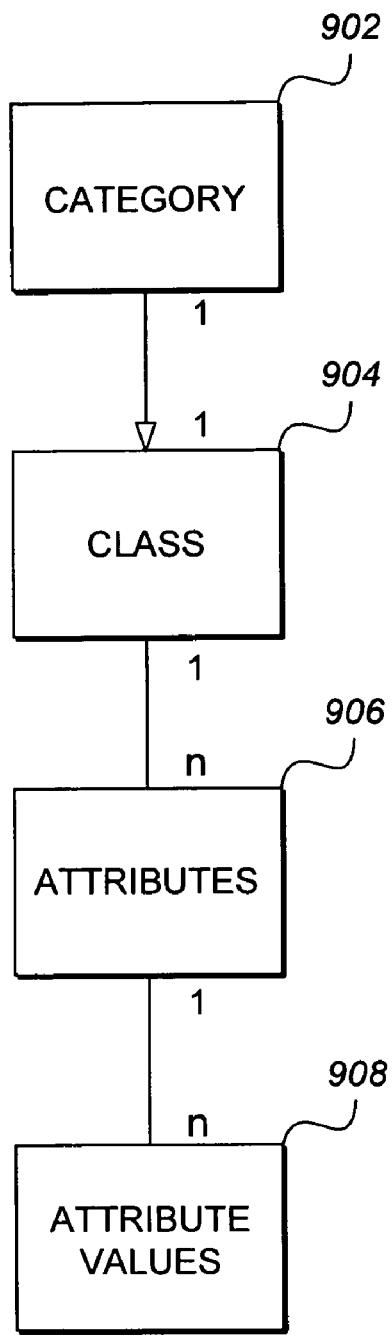
FIG. 9 is a block diagram depicting the relationship of a category, its class type, class attributes, and their values according to the present invention.

It was noted that at step 414 a staff or administrative user 92 must add a new data item definition into the database 212 if one does not exist in the database to properly associate with an entry field identifier. Before discussing the process for adding a new data item definition into the database 212, it is helpful to discuss the structure of the database 212. The database 212 is based on a table structure including a table of entries referred to as "categories". It will be understood that data item definitions exist in the database 212 as row entries in the category table. Turning to FIG. 9, a category 902 is defined by a class type 904. Class types 904 include module, field, document, application, and other class types. A category 902 that is defined by a class type 904 that is an application class type, for example, represents a form. A category 902 that is defined by a class type 904 that is a field, for example, is a data item definition that may be associated with an entry field on a form.

Class types 904 define attributes 906 of the category 902, and each attribute 906 may be assigned one or more values.

Figure 10A:
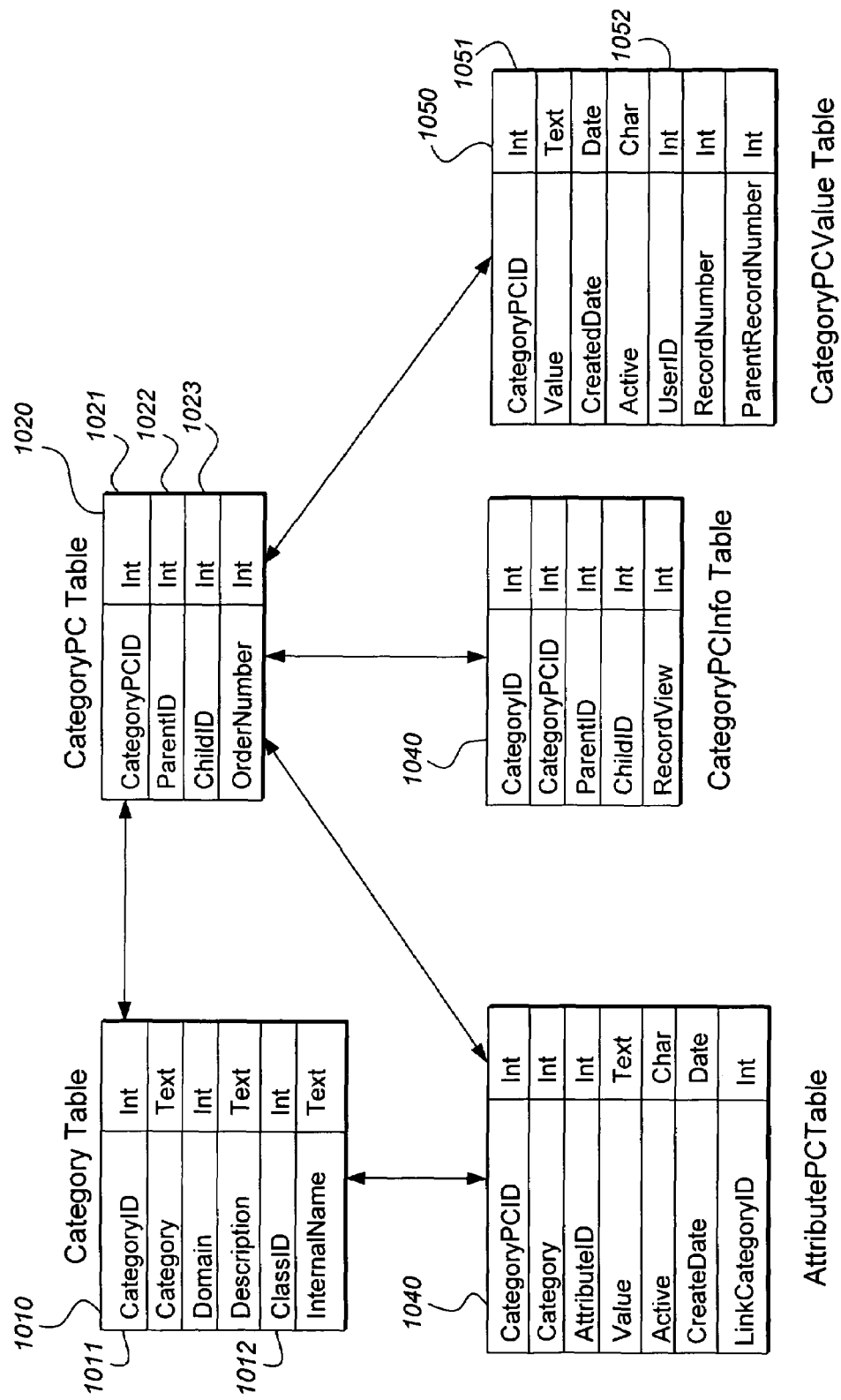
FIG. 10A is an entity relationship diagram showing the primary database tables used to organize data within the database according to the present invention.

Turning now to FIG. 10A, key data tables in the database 212 are shown. The category table 1010 stores each new category as a new row entry. Each category is identified by a categoryID 1011 that is essentially a sequential row number of the category in the category table 1010, and assigned a classID 1012 to identify the class of the category.

Key to the structure of the database 212 is the concept of a parent/child relationship between categories in the database. Thus, a categoryPC table 1020 includes row entries that map categories to one another. A categoryPCID element 1021 identifies a specific instance of a mapping between categories and is essentially a sequential row number of the categoryPC entry in the categoryPC table 1020, while a parentID element 1022 identifies the parent category in the relationship and a childID element 1023 identifies the child. Data values are stored in a categoryPCValue table 1050 that uniquely identifies data value instances by a categoryPCID index 1051, and by userID 1052.

Turning now to FIG. 10B, table entries are shown for the category table 1010, categoryPC table 1020, and categoryPCValue table 1050 for a hypothetical form called "My Application" that has entries for an individual's first name, last name, address1, address2, and a reference, the reference being identified by first and last names and a telephone number. It can be noted that the individual's first and last names and address entries are organized as children of a module category called "Personal Info."

Figure 11:
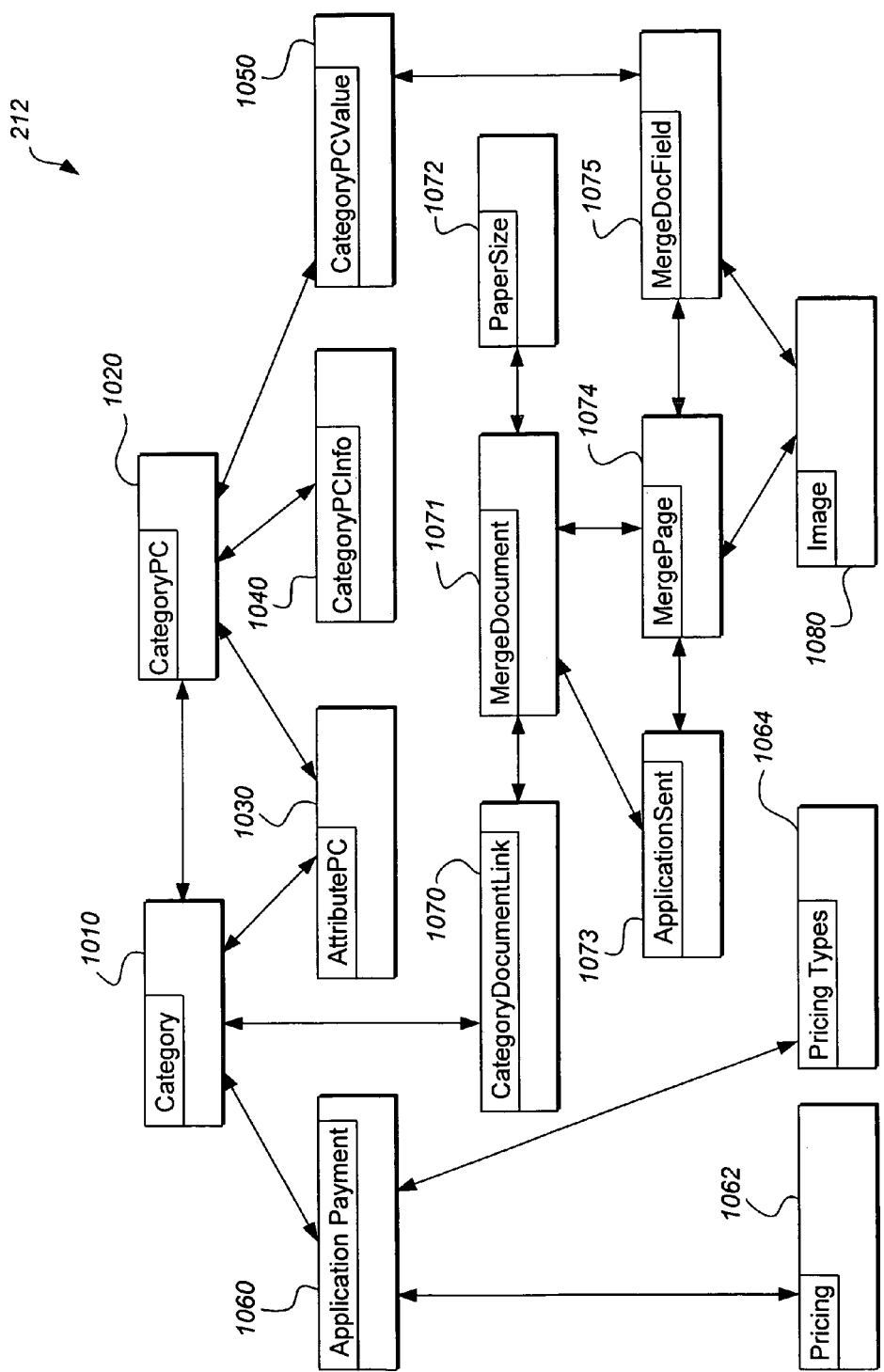
FIG. 11 is an entity relationship diagram depicting a full database schema for the present invention.

Turning now to FIG. 11, a complete schema for the database 212 shows all of the tables used. It can be seen that tables CategoryDocumentLink 1070, MergeDocument 1071, PaperSize 1072, MergePage 1074, and MergeDocField 1075 exist for managing document images and merging electronic entry field data values for printing of a completed application image. Additionally, tables ApplicationPayment 1060, Pricing 1062, and PricingTypes 1064 are included to manage payments for a commercial form filling service.

Figure 4:
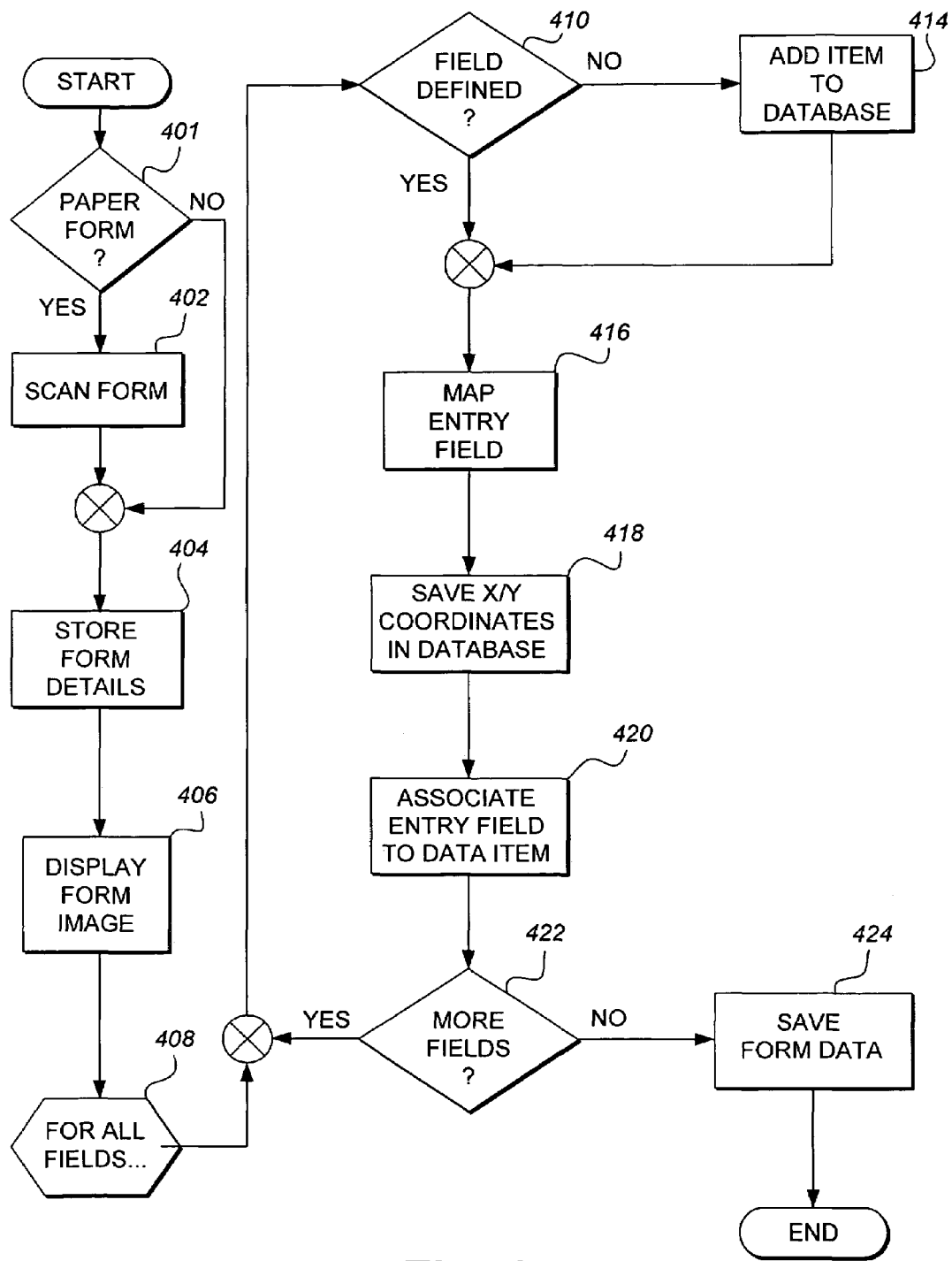
FIG. 4 is a flowchart of a process for uploading an application image and mapping data entry fields of the application to data items stored in a database according to the present invention.
Figure 12:
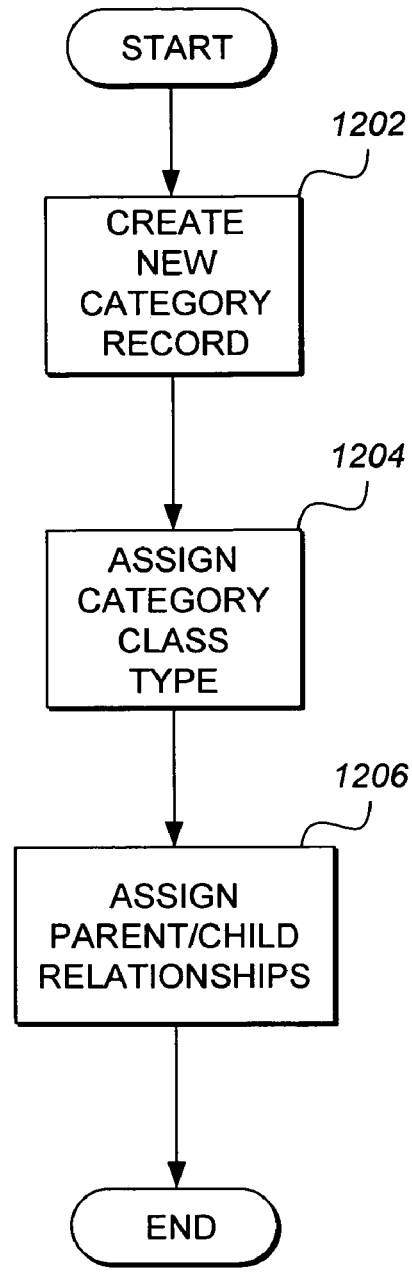
FIG. 12 is a flowchart of a process for adding a new data item to the database according to the present invention.

With an understanding of the structure of the database 212, the step 414 identified on FIG. 4 wherein a staff or administrative user 92 adds a new data item definition into the database 212 can be revisited. Referring to FIG. 12, the process of adding a new data item definition into the database 212 is described beginning with step 1202 when a new category record is created as a new row entry in the database 212. Once the category record is created, it is assigned a class type at step 1204. Finally, at step 1206, parent/child relationships for the new category, it's parent and it's child categories are assigned.

Figure 13:
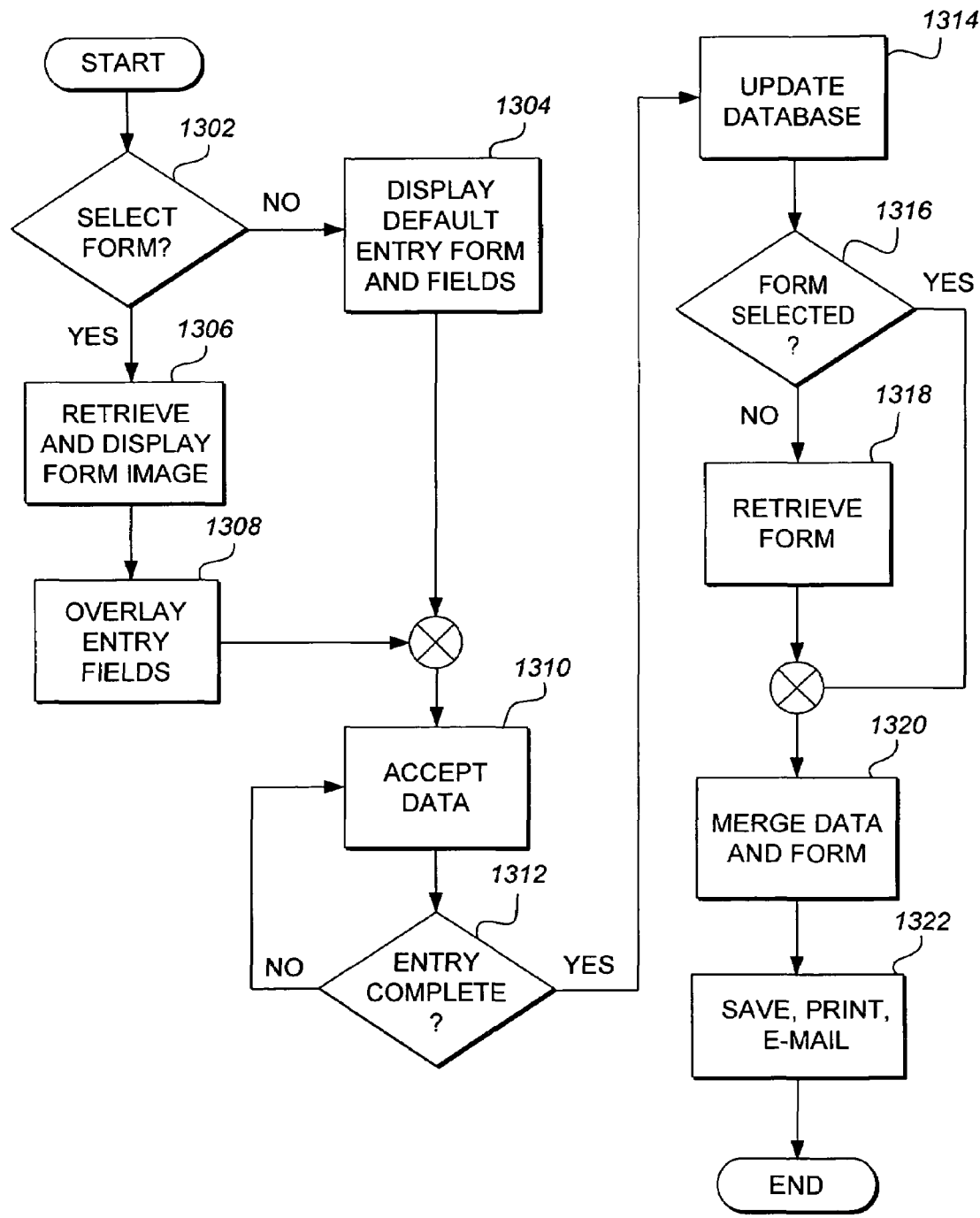
FIG. 13 is a flowchart of a process for entering user data into a database and completing an application according to the present invention.

Once an application form has been received from a form provider 90 and mapped by a staff or administrative user 92, the form is available for a form filler 94 to complete. The form filler 94 may complete a form from his personal data already stored in the database 212, or may enter new or updated personal data prior to completing a form. Turning to FIG. 13, a process is shown wherein a form filler 94 enters data first and then completes a form.

Beginning at step 1302, the form filler 94 may elect to begin by selecting a specific form for data entry, or may elect to use a default data entry display. If the form filler 94 selects a form from the database, an electronic form image is displayed on the form filler's computer workstation display, at step 1306. At step 1308, the computer program 211 overlays the displayed electronic form image with electronic entry fields. Alternatively, if the form filler 94 had chosen to use a default entry display, at step 1304 the computer program 211 generates and displays a default data entry form along with electronic entry fields suitable for entering the data. Preferably, the computer program generates a web page including the electronic form image or default data entry form and electronic entry fields suitable for display and data entry on a computer workstation 216.

At step 1310, data is accepted in the electronic entry fields until the form filler 94 indicates that the data entry is complete. Once the data entry is complete at step 1312, the database 212 is updated at step 1314, adding new value entries into the database's categoryPCValue table uniquely identified for the form filler 94.

With the form filler's information now entered into the database 212, the form filler 94 may proceed to complete a form. If the form filler, at step 1302, chose not to select a specific form for data entry, a form is now chosen at step 1318. The computer program 211, at step 1320, merges the electronic form image together with the form filler's personal data to create a completed, printable electronic form image. At step 1322, the completed, printable electronic form image may be saved, printed for use, or e-mailed to a recipient for the form.

It is to be understood that the present invention is not limited to the embodiment described above, but encompasses any and all embodiments within the scope of the following claims.

I claim:

1. A computerized system for automated completion of forms, comprising:
    (a) a server computer having a microprocessor, an area of main memory for executing program code under the direction of the microprocessor, and a disk storage device for storing data and program code;
    (b) a database accessible by said server computer, the database containing data item definitions;
    (c) data input means for entering data input cognizable by said microprocessor; and
    (d) a computer program stored in the disk storage device and executing in main memory under the direction of the microprocessor, the computer program including:
        (i) data defining means for creating new data item definitions in said database;
        (ii) data item mapping means for associating a data item definition within said database with at least one other data item definition in said database in a parent/child association;
        (iii) form entry means for inputting an electronic form image representative of a paper form having data entry fields and storing said electronic form image in a database;
        (iv) form mapping means for accepting a user input identifying a screen position of said data entry fields, and for creating electronic form field definitions corresponding to said data entry fields, each electronic form field definition including the screen position and an association with one of said data item definitions in said database; and
        (v) form filling means for displaying said electronic form image overlaid with electronic text entry fields defined by said electronic form field definitions, and for accepting input data in said electronic text entry fields.

2. The computerized system for automated completion of forms according to claim 1, wherein said form mapping means comprises means for generating a web page and for delivering the web page to a remote workstation computer for display by a client program running on said remote workstation computer.

3. The computerized system for automated completion of forms according to claim 2, wherein said form mapping means further comprises means for including a client side program in said web page, the client side program comprising client side mapping means for accepting a user input identifying the screen position of said data entry fields and creating electronic form field definitions corresponding to said data entry fields.

4. The computerized system for automated completion of forms according to claim 3, wherein said client side program further comprises means for communicating said electronic form field definitions to said server computer, and wherein said computer program further comprises means for receiving said electronic form field definitions from said client side program.

5. The computerized system for automated completion of forms according to claim 1, wherein said form filling means comprises means for generating a form filling web page, the form filling web page comprising said electronic form image overlaid with said electronic text entry fields.

6. The computerized system for automated completion of forms according to claim 5, wherein said form filling means further comprises means for receiving form data entered into said form filling web page and storing the form data in said database.

7. The computerized system for automated completion of forms according to claim 1, further comprising a document scanner in communication with said server computer, wherein said form entry means comprises means for operating the document scanner, for receiving an electronic form image from the document scanner, and for storing the electronic form image in said database.

* * * * *